Oct. 29, 1935.　　　　　J. N. KIRBY　　　　　2,018,763
WOOD CARVING MACHINE
Filed Feb. 11, 1929　　　12 Sheets-Sheet 1

INVENTOR
JULIAN N. KIRBY
By
ATTORNEYS

Oct. 29, 1935.   J. N. KIRBY   2,018,763
WOOD CARVING MACHINE
Filed Feb. 11, 1929   12 Sheets-Sheet 2

INVENTOR
JULIAN N. KIRBY
By
ATTORNEYS

Oct. 29, 1935.  J. N. KIRBY  2,018,763
WOOD CARVING MACHINE
Filed Feb. 11, 1929   12 Sheets-Sheet 3
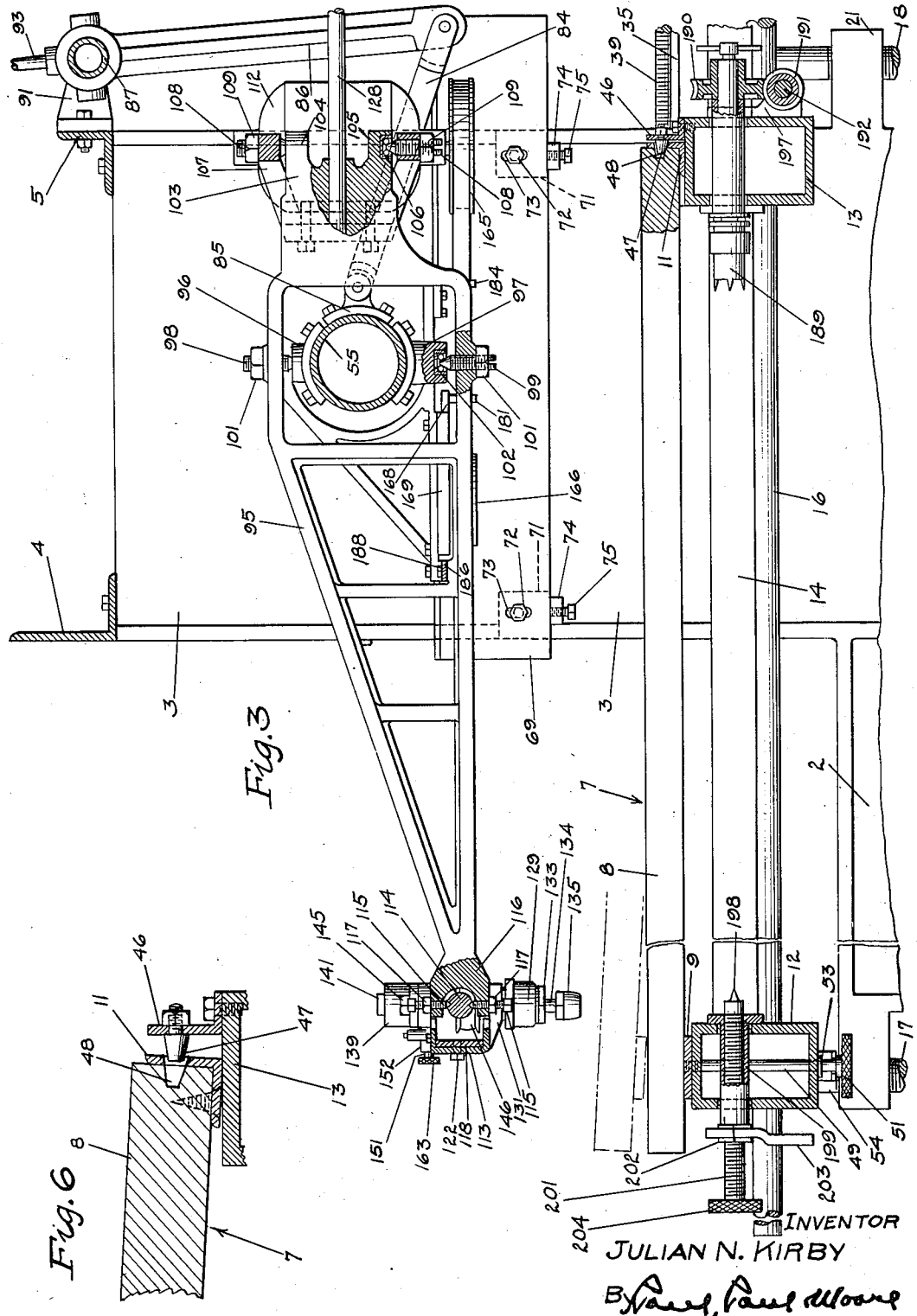
INVENTOR
JULIAN N. KIRBY
By Nash, Paul Moore
ATTORNEYS

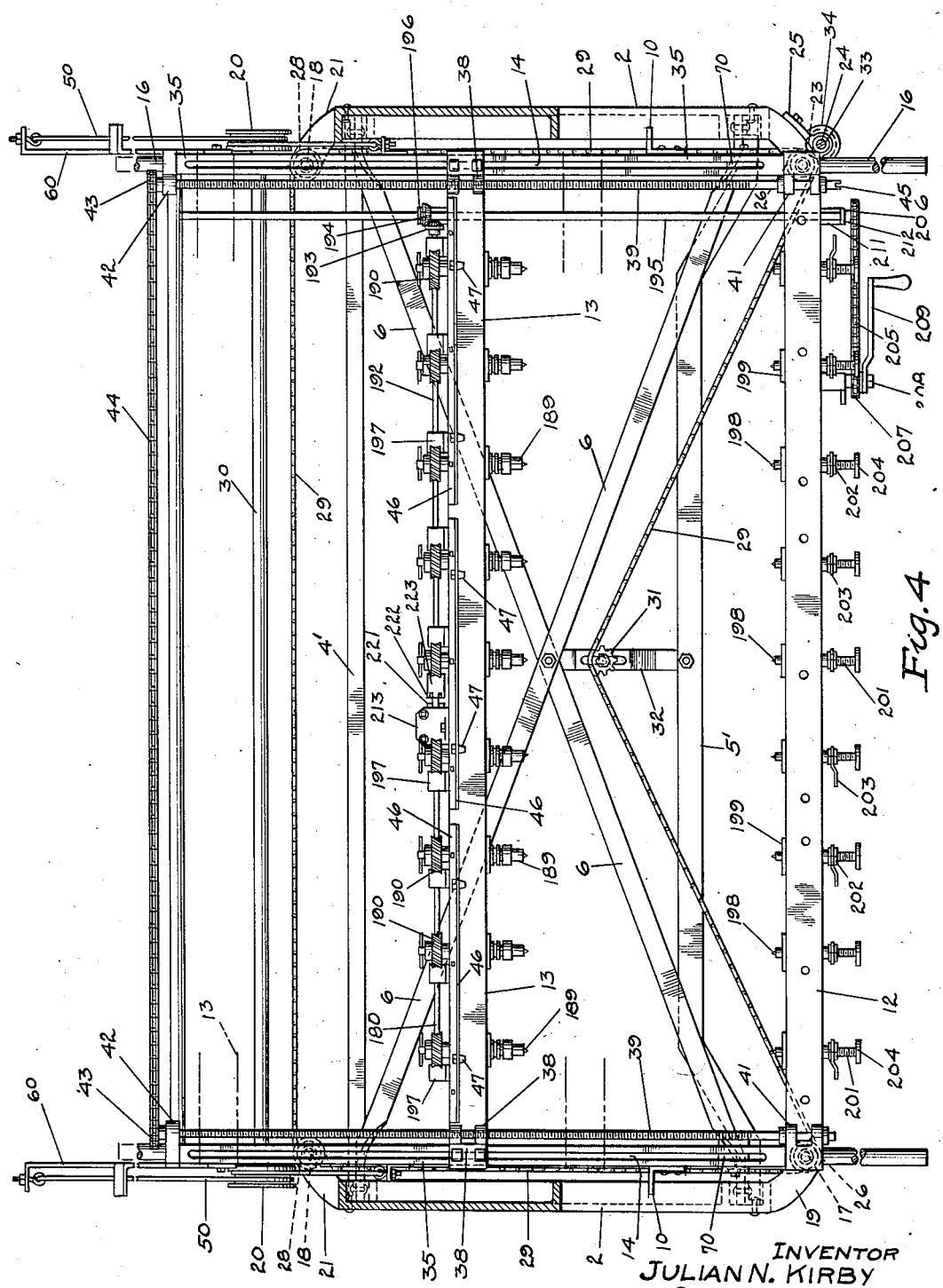

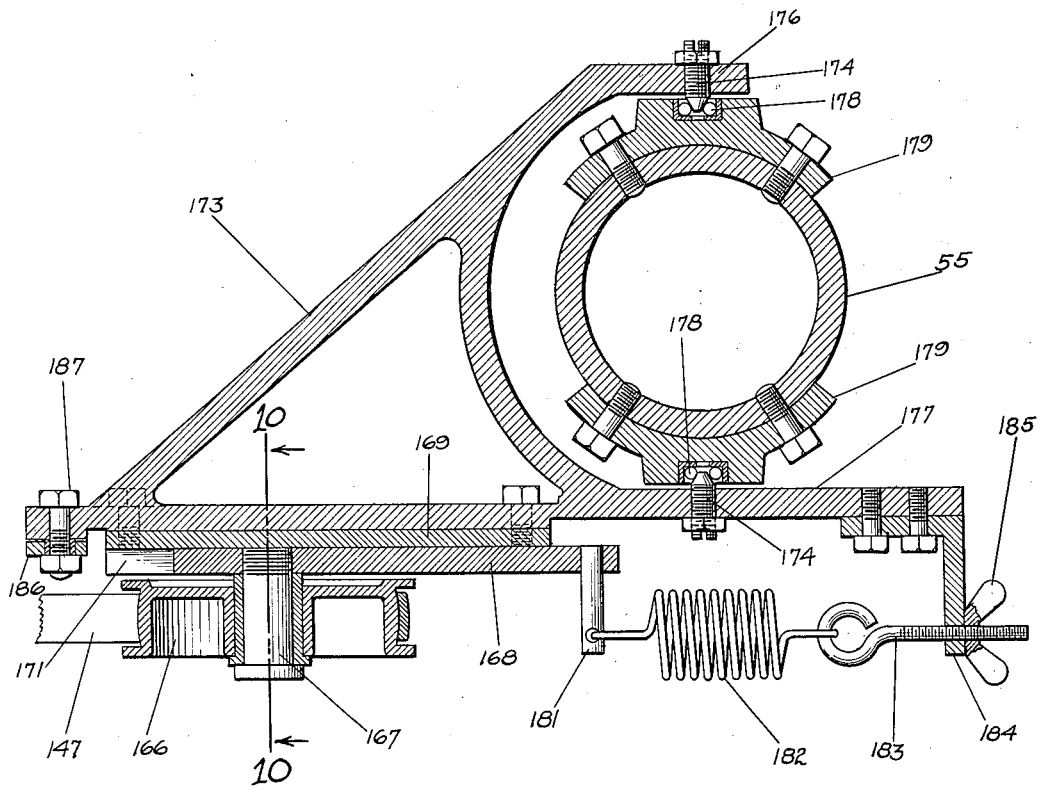
Fig. 9
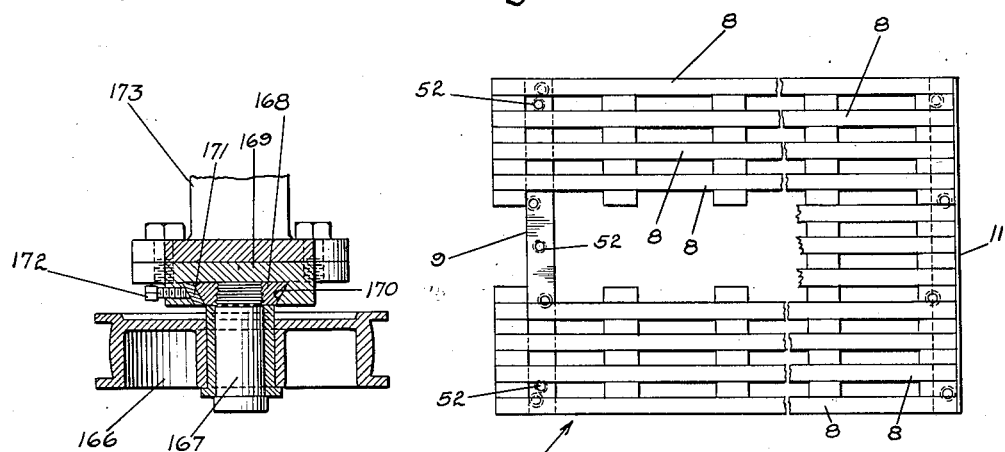
Fig. 10
Fig. 5

Oct. 29, 1935.   J. N. KIRBY   2,018,763
WOOD CARVING MACHINE
Filed Feb. 11, 1929   12 Sheets-Sheet 6

INVENTOR
JULIAN N. KIRBY
BY
ATTORNEYS

Oct. 29, 1935.   J. N. KIRBY   2,018,763
WOOD CARVING MACHINE
Filed Feb. 11, 1929   12 Sheets-Sheet 7

INVENTOR
JULIAN N. KIRBY
BY Paul, Paul Moore
ATTORNEYS

Oct. 29, 1935.  J. N. KIRBY  2,018,763
WOOD CARVING MACHINE
Filed Feb. 11, 1929     12 Sheets-Sheet 8

INVENTOR
JULIAN N. KIRBY
ATTORNEYS

Oct. 29, 1935.　　　　J. N. KIRBY　　　　2,018,763
WOOD CARVING MACHINE
Filed Feb. 11, 1929　　　12 Sheets-Sheet 9

INVENTOR
JULIAN N. KIRBY
ATTORNEYS

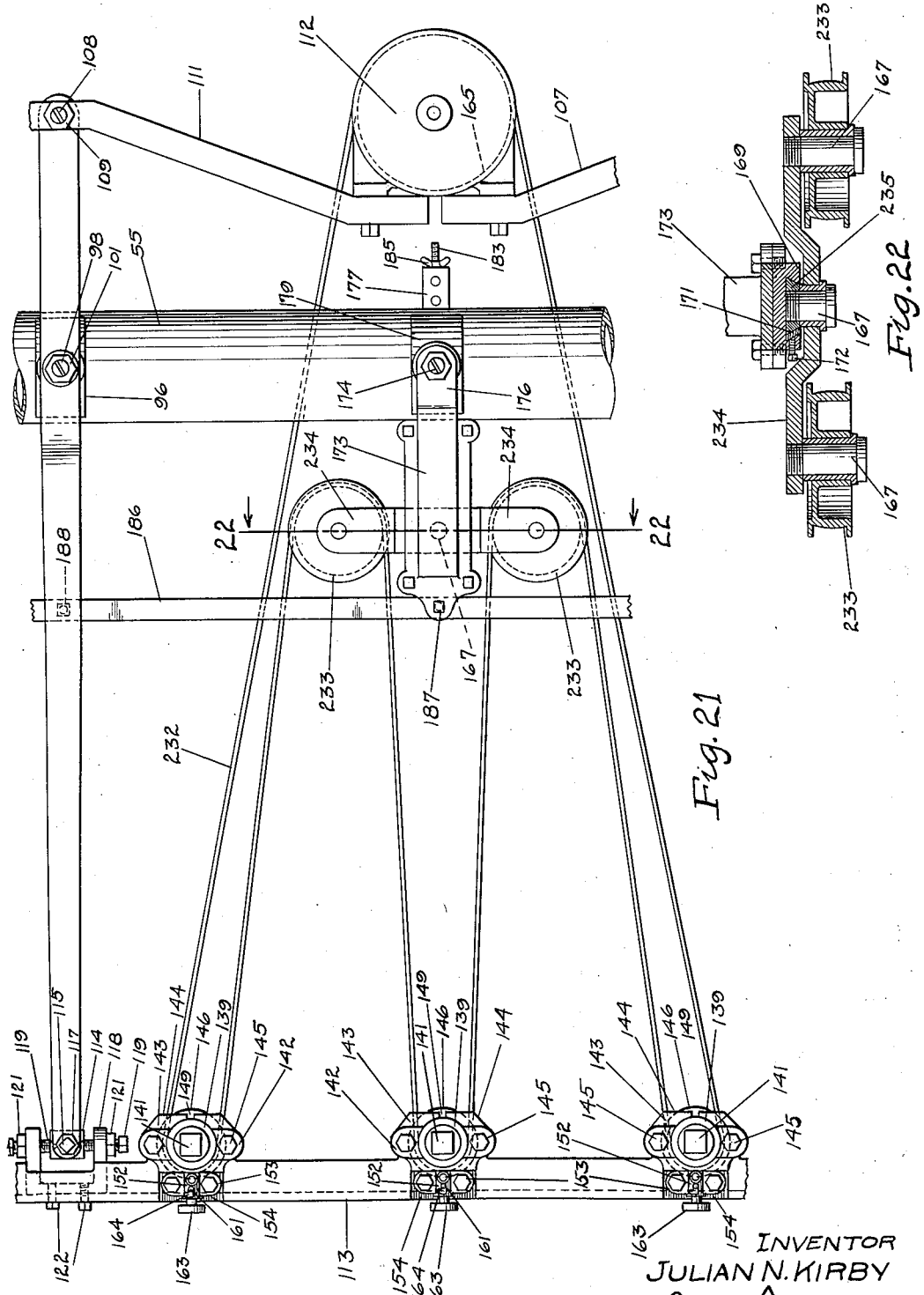

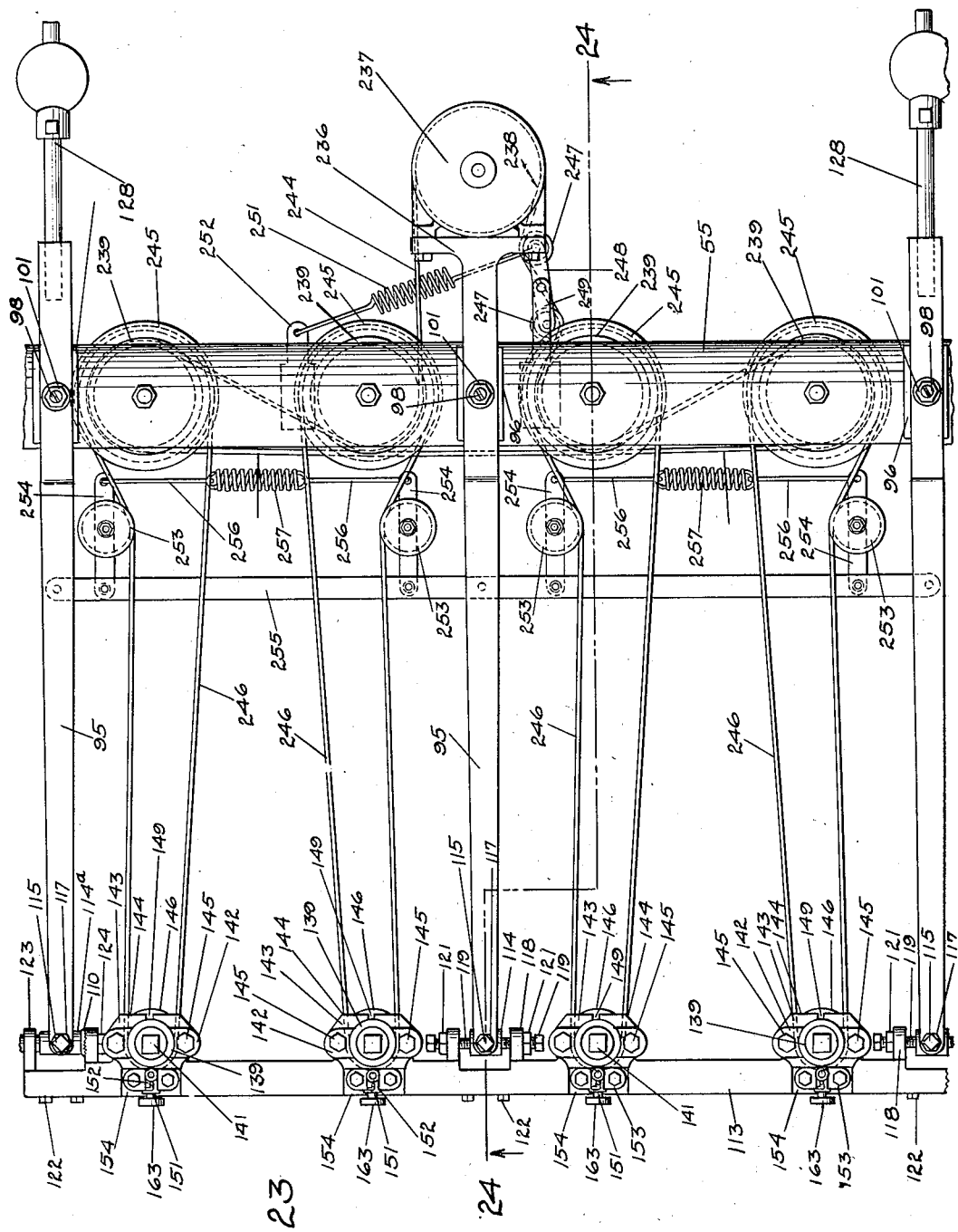

Patented Oct. 29, 1935

2,018,763

UNITED STATES PATENT OFFICE 2,018,763

WOOD CARVING MACHINE

Julian N. Kirby, St. Paul, Minn., assignor to St. Paul Machinery Manufacturing Company, St. Paul, Minn., a corporation of Minnesota Application February 11, 1929, Serial No. 339,083

11 Claims. (Cl. 90—13.3)

This invention relates to new and useful improvements in wood carving machines of the type employing a plurality of carving tools and a tracer or follower, adapted to follow the contour of a master pattern or model, and which is connected with the carving tools in a manner to cause the latter to follow the movements of the tracer or follower, as it is guidingly moved over the surface or contour of the master pattern.

An object of the invention is to provide in a carving machine, an improved table top comprising a plurality of sections, each demountably supported upon the machine frame, and having means at the rear end thereof for firmly holding it against the frame to prevent warping thereof, and the front portion of each section being secured in place by suitable bolts or hand screws, inseparably mounted in the machine frame, and located to permit convenient operation thereof.

A further object is to provide a wood carving machine comprising a carriage mounted for forward and backward movement over the machine table, and adapted to movably support a plurality of arms having a tool-supporting bar pivotally connected with the forward ends thereof, and said carriage being mounted upon anti-friction rollers or wheels adapted to travel on suitable rails secured to the machine frame, and each of said wheels being enclosed within a novel housing having means adapted to engage said tracks to prevent rocking movement of the housings, and said housings further having wiper elements detachably secured thereto and adapted to engage the tracks to keep the latter clean and free from foreign matter, which might interfere with the rolling movement of the wheels thereon.

A further object is to provide an improved tool-supporting head for a wood carving machine, comprising a spindle rotatably mounted in suitable bearings provided in the cutter bar, and one of said bearings being demountably supported in a slotted member whereby, when said bearing is removed from the member, an endless belt may be threaded around the pulley, secured to the spindle between said bearings, without removing the spindle from the cutterhead.

A further object is to provide a safety mechanism for each tool-supporting spindle, comprising a locking bolt movably mounted within a casing demountably secured to the tool-supporting head, and adapted to lock the spindle against rotation, when changing tools, and said mechanism also having means for preventing accidental engagement of the lock with the spindle, while the machine is in operation.

A further object is to provide an improved drive for the tool-supporting spindles, including a motor mounted between each pair of arms and having an endless belt operatively connecting it with two of the spindles, and further having a belt tightener adapted automatically to maintain a constant tension in the belt; the motor being so arranged with respect to the spindles as to permit freedom of movement of the arms and carriage without effecting the tension in the belts.

A further object is to provide a reversible driving mechanism for the work-supporting centers of a carving machine, so constructed that all of the work-supporting centers may be rotated in one direction or, if desired, one half of the centers may be rotated in one direction while the other half is rotated in the opposite direction, whereby the machine may be utilized for carving right and left hand spindles, furniture legs, and other work which may be carved between centers.

Features of the invention reside in the general construction and arrangement of the arms and their supporting means; the construction of the housings enclosing the wheels provided at the ends of the tubular arm-supporting member, including the means associated therewith for preventing rotation of said housings; the means provided for demountably securing the table sections to the machine frame; the constructional details of the supporting heads; the particular arrangement of the belt drives for the spindles; and, in other constructional details of the machine.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the accompanying drawings forming part of this specification;

Figure 3 is an enlarged detail sectional view showing a portion of the machine frame and the arrangement of the arms thereover;

Figure 4 is a sectional plan view on the line 4—4 of Figure 2, showing the table sections removed from the machine;

Figure 5 is a plan view showing one of the table sections removed from the machine;

Figure 6 is an enlarged detail sectional view showing the means provided at the rear of the machine for securing the table sections in place;

Figure 9 is an enlarged detail sectional view on the line 9—9 of Figure 8, showing the means provided for taking up slack in the belt;

Figure 10 is a detail sectional view on the line 10—10 of Figure 9, showing the guide for the idler pulley support;

Figure 21 is a view showing a modified form of belt drive for the spindles, wherein three spindles are operated by one motor;

Figure 22 is an enlarged detail sectional view on the line 22—22 of Figure 21;

Figure 23 is a view showing another modified form wherein four spindles are operated by one motor;

Frame

Figure 1:
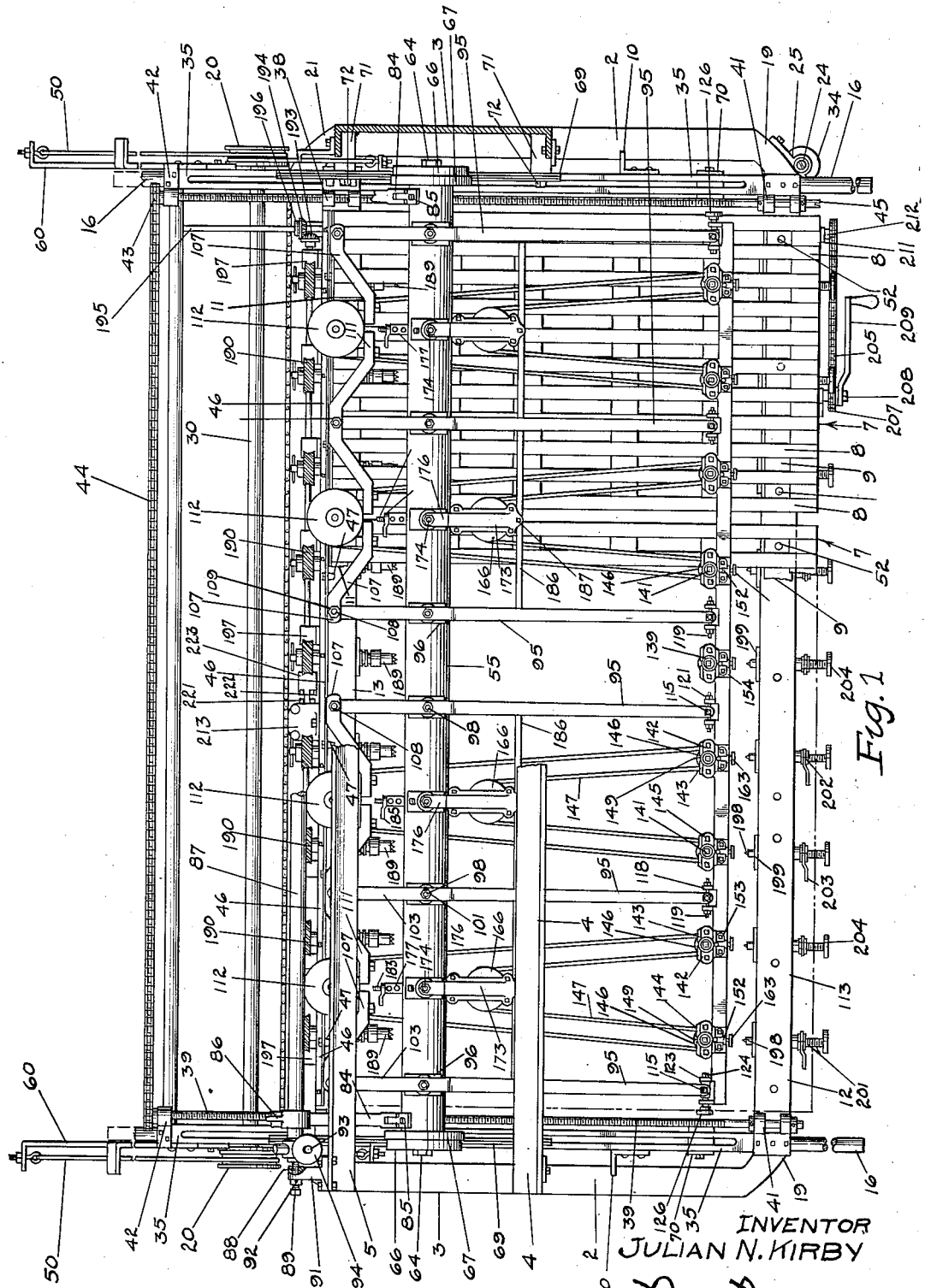
Figure 1 is a plan view, showing a wood carving machine with the invention embodied therein.

The main frame of the novel wood-carving machine featured in this invention comprises end members 2—2, each preferably formed with an upstanding portion 3 connected together at their upper ends by suitable angle irons 4 and 5. The lower portions of the end members 2—2 are secured together by longitudinally extending members 4' and 5', and suitable diagonal braces 6—6.

Table and supporting means

The table comprises a plurality of removable sections 7, each formed of a plurality of spaced-apart slats 8, the forward ends of which are secured to a flat bar 9 and the rear portions to an angle iron 11. The table sections 7 are supported upon front and rear supporting beams 12 and 13, shown in Figure 4. The beam 12 has its terminals secured to a pair of channel members 14, provided with anti-friction rollers 15 adapted to roll on tracks 16, here shown as being circular in cross section. The rails 16 are supported upon posts 17 and 18 mounted for vertical adjustment in guides 19 and 21, respectively, preferably integrally formed with the end members 2, as shown in Figure 2.

Figures 2, 7:
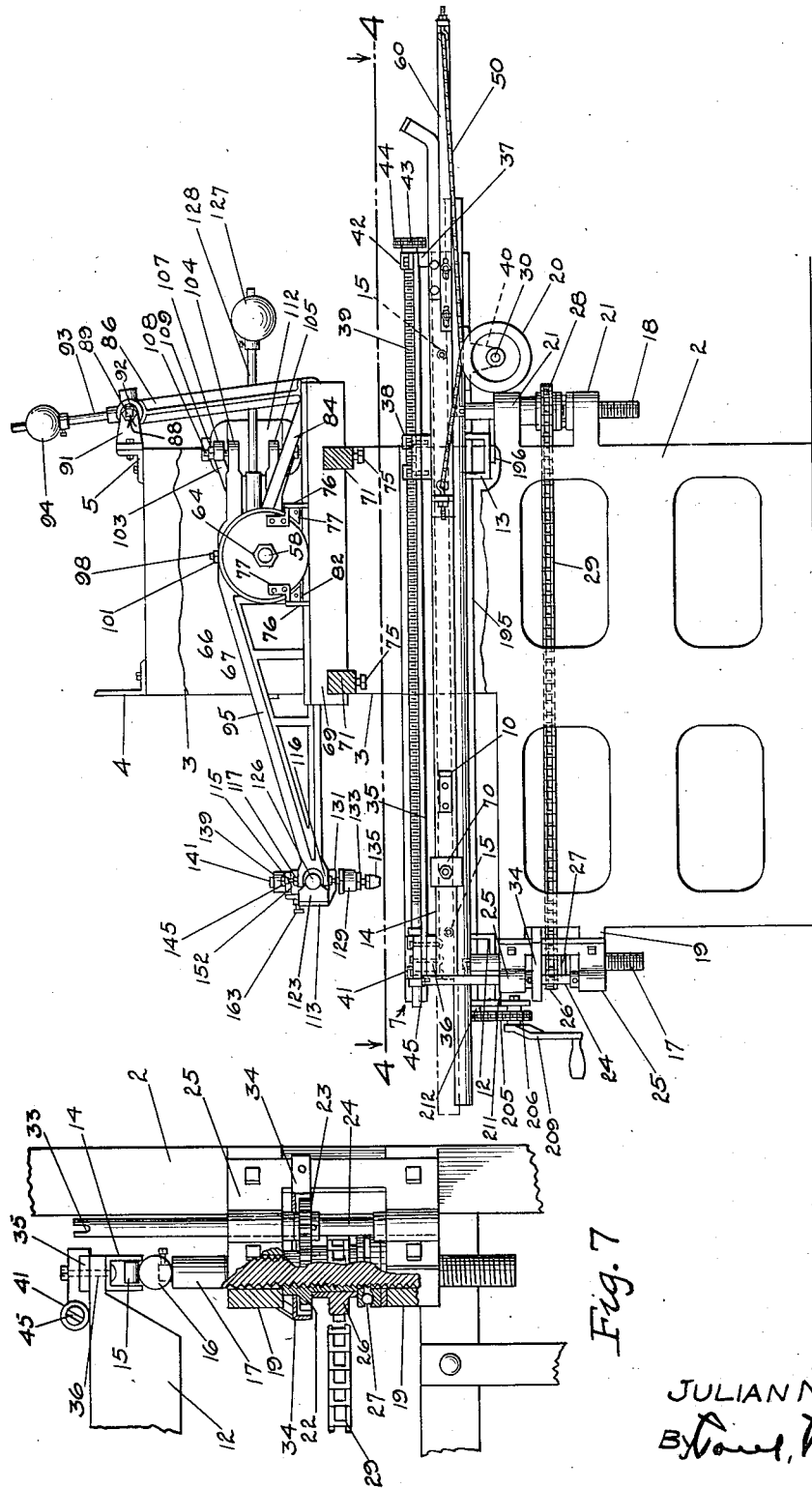
Figure 2 is an end elevation of Figure 1, partially broken away.
Figure 7 is an enlarged detail view of a corner of the machine frame, partially broken away.

The posts 17 and 18 are threaded as shown in Figures 2 and 7. The post 17 at the right hand side of the machine, has a pinion 22 received in threaded engagement therewith which meshes with a gear wheel 23 secured to a rod 24, rotatably mounted in suitable bearings provided in a bracket 25, as shown in Figures 2, 4, and 7. The gear 23 is preferably located at the front of the machine so that the rod 24 may be conveniently rotated to vertically adjust the rails 16. The pinion 22 is here shown mounted between the bearings 19, provided at the right hand end of the machine. A sprocket wheel 26 is secured to the gear wheel 22 and is adapted for rotation therewith, when the latter is actuated by rotation of the pinion 23. Suitable thrust bearings 27 are preferably provided between the lower ends of the sprockets 26 and 28 and the upper surfaces of the lower guides 19, to carry the load of the beams 12 and 13 and the parts associated therewith.

Sprockets 28 are mounted upon the threaded rod 17, at the left hand end of the machine, and the rods 18 at the rear of the machine. These sprockets are in threaded engagement with their respective rods, and are connected with the sprocket 26 by an endless chain 29. The front run or section of the chain 29 is engaged with a belt tightener sprocket 31, adjustably mounted upon a bar 32 secured to the diagonal braces 6 and the front frame member 5, as shown in Figure 4. By thus connecting together the four sprockets, the table supporting beams 12 and 13 may be simultaneously vertically adjusted by rotation of the rod 24, shown in Figure 7, which, it will be noted, has a slot 33 at its upper end adapted to receive a suitable crank. The pinion 22 and gear 23 are preferably enclosed in a suitable casing 34, shown in Figure 7.

The table-supporting beam 12, at the front of the machine frame, is secured to the channel members 14, and a guide bar 35 is secured to each channel member in spaced relation thereto, as shown in Figures 2 and 7. The terminals 36 of the supporting beam 12 provide spacers for the forward ends of the guide bars 35, and the rear portions thereof are spaced from the channel members by suitable spacing blocks 37, best shown in Figure 2. The rear supporting beam 13 is adjustably mounted with respect to the channel members 14 and the front beam 12, and each end portion thereof is provided with threaded lugs 38 adapted to receive threaded rods or stems 39, rotatably mounted in suitable guides 41 and 42, provided at the front and rear of the machine frame, respectively, as shown in Figure 4. Suitable sprockets 43 are secured to the rear ends of the rods 39, and are connected together by a chain 44, so that when one of the rods 39 is rotated, both rods will be simultaneously rotated to adjust both ends of the beam 13, in a manner to retain it in spaced parallel relation to the front beam 12. The rod 39 at the right hand end of the machine preferably has a slotted end 45 adapted to receive a suitable crank, whereby it may be conveniently rotated to adjust the position of the rear supporting beam 13.

The beams 12 and 13, and the channel members 14 form in effect, a rectangular frame adapted to roll backwardly and forwardly upon the tracks 16. This rectangular frame is limited in its rearward movement by suitable stops 10, secured to the channel members 14 and adapted to engage the front edges of the upright frame portions 3, as shown in Figures 1, 2, and 4. Means are provided for stabilizing the movements of the table supporting frame, including the beams 12 and 13 and the channel members 14. Such means comprises a pair of grooved wheels or pulleys 20 secured to a shaft 30, rotatably mounted in bearing brackets 40, secured to the tracks 16, as shown in Figure 2. A chain 50 is coiled around and preferably attached to each pulley 20, and each has one end suitably secured to one of the channel members 14, and its other end to an extension arm 60, adjustably secured to the adjacent channel member 14. By means of this stabilizing mechanism, the front and rearward movements of the opposite ends of the table supporting frame will be substantially synchronized, thus assuring accurate movement of the frame with respect to the cutting tools, which will subsequently be described. The table supporting frame is secured in adjusted position upon the tracks 16, by means of suitable clamping devices 70, shown in Figure 2.

The means provided for demountably securing the table sections 7 to the beams 12 and 13, is best shown in Figures 3 and 6. Preferably, angle irons or brackets 46 are secured to the rear beam 13, and each is provided with two or more tapered dowel pins 47 adapted to be received in correspondingly shaped sockets 48, provided in the rear edges of the table sections 7, as shown in Figure 6. These dowel pins and sockets are so spaced from the upper surface of the beam 13, that when the dowels are received in the sockets 48 and the sections 7 are moved rearwardly, the lower webs or flanges of the angle irons 11 will forcibly engage the upper surface of the beam 13. When thus positioned, the flat bar 9 at the forward portion of each table section 7, will be engaged with the top surface of the supporting beam 12.

Rods 49 are mounted in suitable apertures provided in the beam 12, and each is provided with a hand wheel 51. The upper end of each rod 49 is threaded and adapted to be received in threaded sockets 52 provided in the bars 9, and whereby the forward portion of each table section may be secured to the beam 12. A flange 53 is provided on each rod 49, adjacent to the hand wheel 51, adapted to engage the beam 12, so that when the rods 49 are rotated, the upper threaded ends thereof may be screwed into the sockets 52 to firmly draw the bars 9 into engagement with the upper surface of the beam 12. Each rod 49 is inseparably connected with the beam 12 by means of a small forked bracket 54, secured to the beam 12. By thus securing each table section to the beams 12 and 13, they may be firmly secured thereto in substantially true alinement, thereby providing such a table top which will be uniform and free from irregularities, often prevalent in table tops used in machines of this kind because of the tendency of the table section to warp.

*Carriage and arms*

Figures 11, 12, 13, 14:
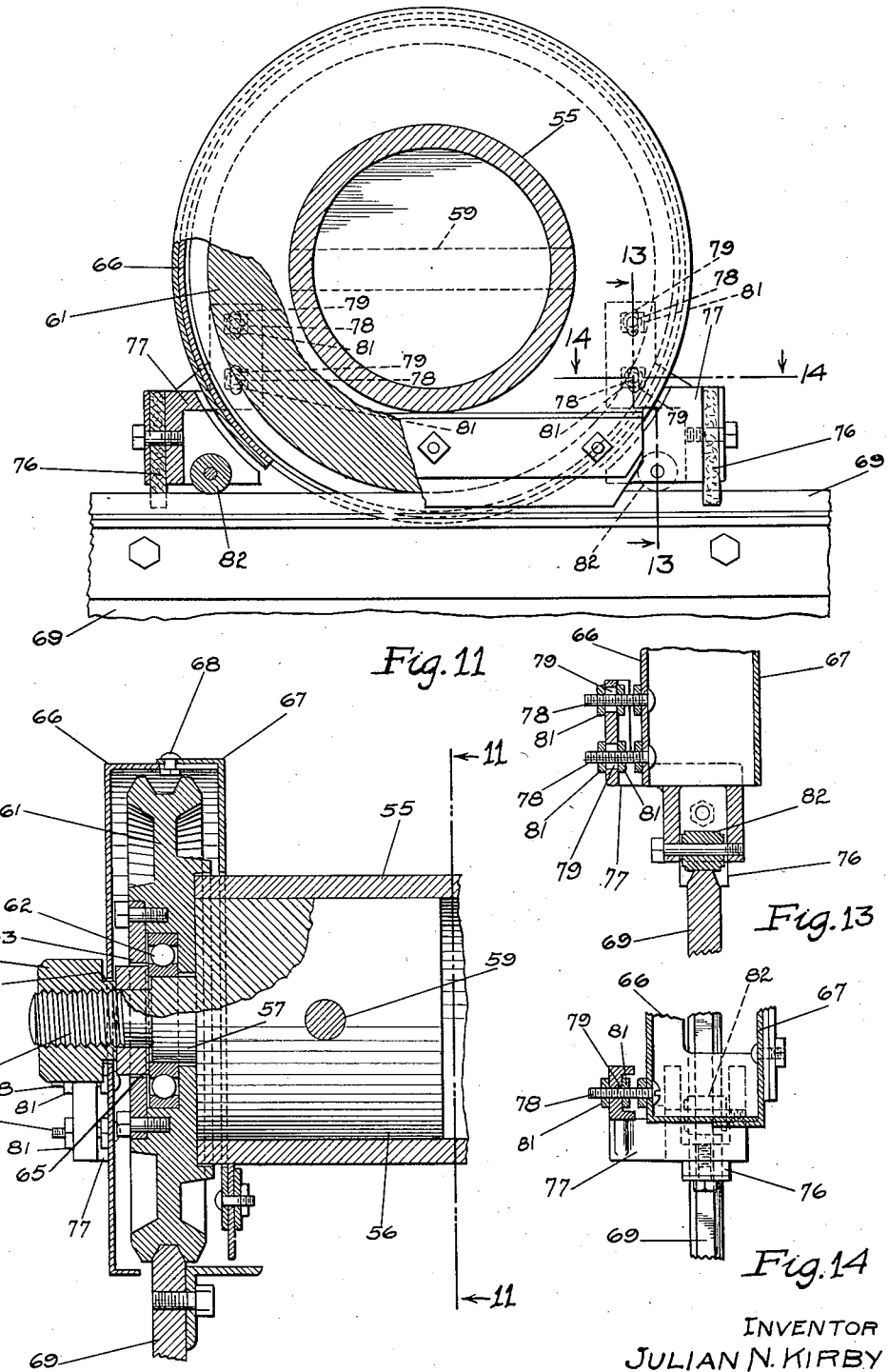
Figure 11 is a detail sectional view on the line 11—11 of Figure 12, showing the means provided at each end of the carriage for supporting the latter.
Figure 12 is a detail sectional view showing one of the anti-friction wheels provided at each end of the carriage.
Figure 13 is a detail sectional view on the line 13—13 of Figure 11.
Figure 14 is a detail sectional view on the line 14—14 of Figure 11.

The carriage comprises a tubular member 55 having a plug 56 secured in each end thereof and provided with a reduced end portion 57, having a threaded extension 58, as shown in Figure 12. The plugs 56 are secured to the tubular member 55, preferably by means of pins 59, shown in Figures 11 and 12. Flanged wheels 61, one of which preferably is peripherally grooved as shown, are provided at the ends of the tubular member 55, and are supported upon suitable antifriction bearings 62, mounted upon the reduced portions 57 of the plugs 56. An annular member or washer 63 is secured to the outer portion of each wheel 61 to provide closures for the bearings 62, as shown in Figure 12. A nut 64 is received in threaded engagement with each extension 58, and is adapted to engage a spacing collar 65, interposed between the inner ball race of the adjacent bearing 62 and the face of the nut 64.

A suitable housing is provided for each wheel 61 and each comprises an outer and an inner section 66 and 67, respectively, secured together by suitable bolts 68, shown in Figure 12. Each housing is open at its bottom to clear a rail or track 69 provided at each end of the machine, and upon which the wheels 61 travel. These rails are supported upon lugs 71, preferably integrally formed with the portion 3 of the end frame members, and are secured thereto by suitable screws or bolts 72, traversing slots 73 in the rails and received in threaded sockets provided in the lugs 71. Each lug has a projection 74 extending beneath its complementary rail 69 to provide a support therefor. An adjusting screw 75 is mounted in each projection 74, whereby the rails 69 may be vertically adjusted with respect to the lugs 71.

Means is provided in connection with each housing to prevent shavings, sawdust, or other foreign material from lodging on the upper edges of the tracks 69, which might cause the wheels 61 to travel unevenly, as the carriage moves backwardly and forwardly over the tracks. Such means consists of a wiper element 76 mounted at each side of the housing and adapted to engage the top surface of the tracks 69 to keep them clean and free from foreign particles. Each wiper element is supported upon a bracket 77 preferably secured to the outer casing member 66 and adapted for vertical adjustment thereon, as shown in Figures 11 and 13. These brackets are supported upon studs 78 secured to the casing members 66, and traverse slots 79 provided in each bracket 77, as shown in Figure 13. Clamping nuts 81 provide means for securing the brackets to the studs 78. The studs 78 and nuts 81 cooperate to secure the brackets in adjusted positions, and provide means for adjusting the brackets vertically and horizontally, so as to cause the wiper elements 76 to properly engage the top surfaces or edges of the tracks 69.

A small roller 82 is mounted in each bracket 77 adapted to roll on the tracks 69. These rollers prevent the casings 66—67 from oscillating, when the tubular member 55 is relatively rocked with respect to the tracks 69. The housing for each wheel 61 is retained in proper position with respect to its complementary wheel 61 by means of an annular recess 83 provided in each nut 64, as shown in Figure 12. By thus supporting the housings upon the carriage or tubular member 55, the latter may be relatively rocked without imparting such a motion to the housings.

Means are provided for retaining the tubular member 55 substantially in true parallel relation with respect to the longitudinal center line of the machine frame and, as here shown, comprises a pair of links 84, each having one end pivotally connected to the member 55. Brackets 85 are secured to the periphery of the member 55, and to these brackets the arms or links 84 each have one end connected. The opposite ends of the links 84 are pivotally connected to the lower swingable ends of a pair of arms 86, the upper ends of which are secured to a bar 87, preferably circular in cross section. This bar is supported upon centers 88 of adjusting screws 89, adjustably mounted in suitable brackets 91, preferably secured to the top angle iron 5, as shown in Figures 1 and 2. Lock nuts 92 are provided for locking the adjusting screws 89 in adjusted positions in the brackets 91. Each depending arm 86 has a rod 93 secured to the upper end thereof, upon which a suitable counterweight 94 is mounted, as shown in Figure 2.

A plurality of arms 95 are pivotally mounted upon the tubular supporting member 55 by means of suitable brackets 96 and 97, secured to the member 55, and pivots 98 and 99, adjustably mounted in the upper and lower portions, respectively, of each arm 95. The pivots 98 and 99 are secured in adjusted positions by means of lock nuts 101. Suitable anti-friction bearings 102 are mounted in sockets provided in the brackets 96 and 97, and are engaged with the terminals of the pivots 98 and 99, as particularly shown in Figure 3. Each arm has a rearwardly extending portion 103 provided with vertically spaced lugs 104 and 105, each provided with a socket adapted to receive an anti-friction bearing 106. The arms 95 at each end of the machine, and also the two arms at the center of the machine, have their rear portions pivotally connected to a plurality of forked brackets 107, by means of adjustably mounted pivot pins 108, having their terminals engaged with the anti-friction bearings 106 provided in the spaced legs of the brackets 107. Lock nuts 109 secure the pivot pins 108 in adjusted positions.

Relatively longer brackets 111 are similarly connected to the rear portions of the intermediate arms 95. The opposite ends of the brackets 107 and 111 are substantially alined as shown in Figure 1, and a motor 112 is suitably bolted to the adjacent ends of each pair of brackets. By thus securely bolting the motors 112 to the ends of the brackets 107 and 111, these brackets and motors cooperate to provide a connection between the rear portions of the arms 95.

An important feature of the invention resides in the particular manner in which the motors 112 are mounted at the rear of the arms 95. These motors are mounted so that their axes are substantially alined with the axes of the pivots 108 connecting the brackets 107 and 111 with the arms 95, as indicated by the dotted line A—A in Figure 8. By thus connecting together the arms, it will be noted that they will always be retained in parallel relation irrespective of their position with respect to the longitudinal center line of the tubular supporting member 55.

Figure 8:
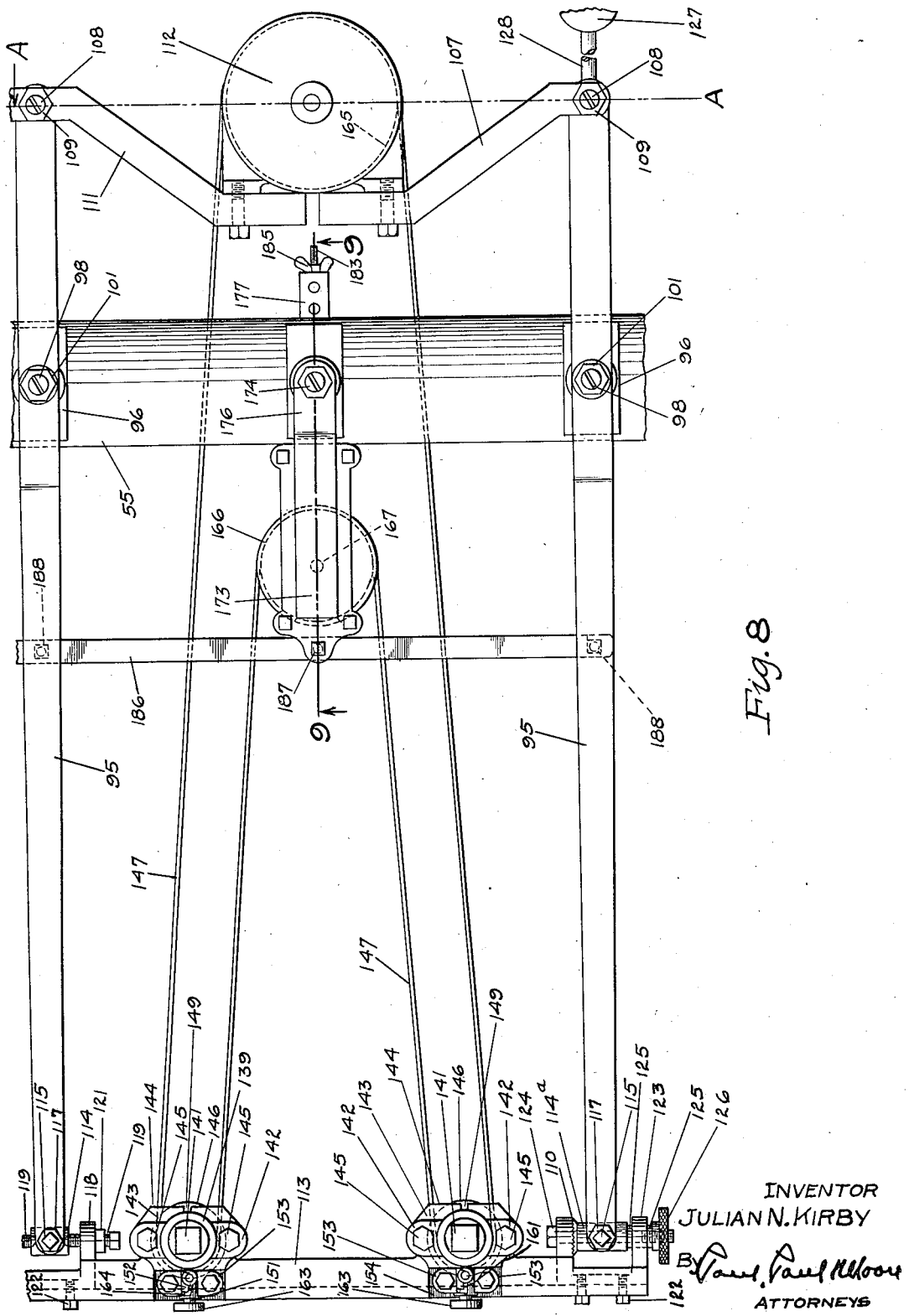
Figure 8 is a plan view showing two of the arms and a preferred form of spindle belt drive.

A cutter bar 113 is pivotally connected to the forward ends of the arms 95 by suitable blocks 114 and 114a, and adjustably mounted pivots 115, received in threaded engagement with the forked ends 116 of the arms, as shown in Figures 3 and 8. The pivots 115 are secured in adjusted positions by suitable lock nuts 117. These pivots permit lateral swinging movement of the arms 95.

The cutter bar 113 is also mounted for adjustment on a horizontal axis, whereby the wood carving tools may be operated at an incline with respect to the table. The connections between the blocks 114 and the cutter bar comprises a substantially U-shaped bracket 118 secured to the bar 113 and having pivot pins 119 adjustably mounted therein, each adapted to engage the opposite ends of the blocks 114, as shown in Figure 8. These pivot pins are secured in adjusted positions by means of lock nuts 121, and the U-shaped brackets 118 are secured to the cutter bar by suitable bolts 122.

Each end or side arm 95 is connected to the cutter bar 113 by means of a similar U-shaped bracket 123, between the spaced legs of which the blocks 114a are mounted, as shown in Figure 8. Each block 114a preferably has one end provided with radial teeth 110, adapted to engage a correspondingly toothed face provided upon one of the legs of the bracket 123. Thus, the end arms 95 are connected to the cutter bar 113 by the bolts 124, traversing the spaced legs of the brackets 123, the block 114a, and spacing collars 125. A hand wheel 126 is received in threaded engagement with each bolt 124, and engages the collars 125. These hand wheels function to tighten the parts and lock the cutter bar in adjusted position.

Two or more of the arms 95 may be provided with suitable counter-weights 127 supported thereon by rods 128, suitably secured to their respective arms, as shown in Figure 3. These counter-weights assist the motors 112 to counterbalance the forward portions of the arms 95 and the parts supported thereon.

*Tool-supporting heads*

Figure 15:
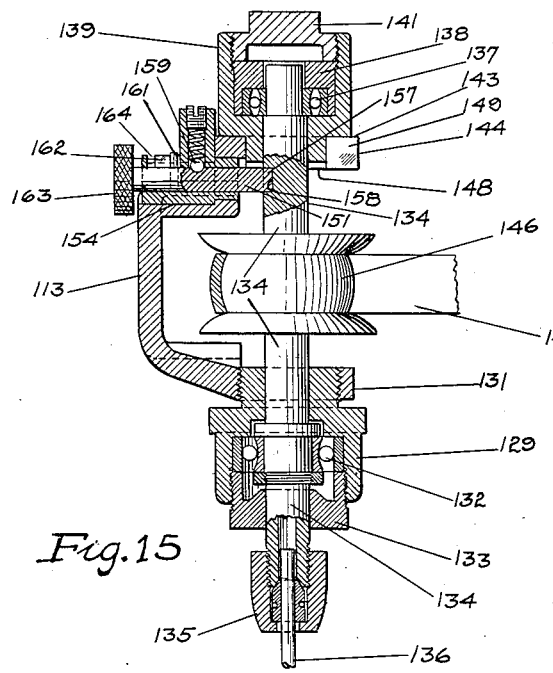
Figure 15 is an enlarged detail sectional view, showing one of the tool-supporting spindles and the supporting means therefor.
Figure 16:
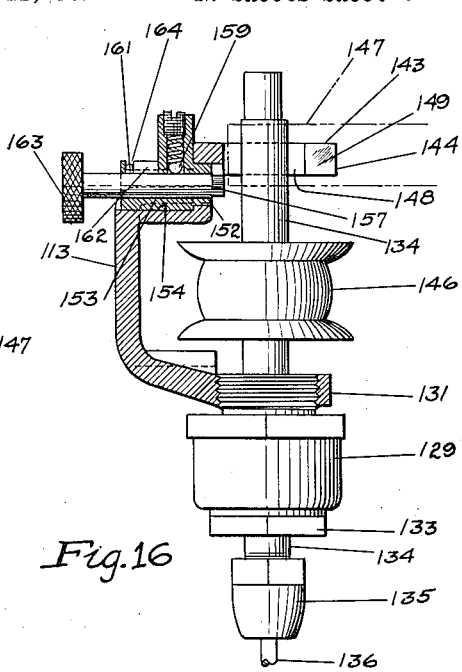
Figure 16 is a view similar to Figure 15, but showing the upper bearing removed to permit the threading of the endless belt around the spindle pulley.

The tool-supporting heads are shown in Figures 15, 16, 17, and 18, and as these heads are of like construction, but one will be described in detail. Each cutter head includes a portion of the cutter bar 113 and comprises a lower bearing-retaining cup 129, received in threaded engagement with a depending portion 131 of the cutter bar. An anti-friction bearing 132 is mounted in the cup 129 and secured therein by means of a nut 133, received in threaded engagement with the cup 129. A spindle 134 traverses the upper portion of the cup 129 and is supported therein by means of the bearing 132. The lower end of the spindle is provided with a suitable chuck 135, adapted to receive the shank of a tool 136, as shown in Figure 15. The upper end of the spindle 134 is supported in an anti-friction bearing 137, mounted in a retaining member 138 secured in a cup-shaped member 139 by means of a lock nut 141. The member 139 is provided with lugs 142 adapted to engage the upper surface 143 of a raised portion 144, provided on the cutter bar 113. Suitable cap screws or bolts 145, secure the member 139 to the portion 144, as shown in Figure 8. A flanged pulley 146 is secured to the spindle 134 between the spaced portions 131 and 144 of the cutter bar.

An important feature of this invention resides in the construction of the upper portion of the tool-supporting head, which is such as to permit the belt 147 to be threaded around the pulley 146, without having to dismantle the entire tool-supporting head. To thus thread the belt 147 around the pulley 146, the upper bearing-retaining member 139 is detached from the head by unscrewing the bolts 145, thereby leaving the upper portion of the spindle extending upwardly through an aperture 148, provided in the portion 144. A slot 149 is also provided in the portion 144 through which the belt may be inserted, as shown in dotted lines in Figure 16 and full lines in Figure 17, a portion of the belt being looped around the upper portion of the spindle when inserting the belt through the slot 149. After the belt has been inserted through the slot 149, it may readily be threaded around the pulley 146, as shown in Figure 15. It will thus be seen that the tool-supporting head need not be removed from the cutter bar 113, when it becomes necessary to engage or disengage the belt from the pulley 146.

Another important feature of the invention resides in the means provided for locking the spindle 134 against rotation when changing tools. Such means consists of a locking bolt 151 slidably mounted in a demountable casing or guide 152, having lugs 153 adapted to be seated in a recess 154 provided in the upper portion of the cutter bar 113, and in which it is secured by means of suitable bolts traversing apertures 155 provided in the lugs 153, and received in threaded engagement with sockets 156 provided in the bottom of the recess 154. The locking bolt 151 has a tongue 157 adapted to be received in a groove or notch 158, provided in the upper portion of the spindle 134, as shown in Figure 15. A spring actuated ball 159 is adapted to engage notches provided in the periphery of the bolt 151 to retain it in operative and inoperative positions.

Figures 17, 18:
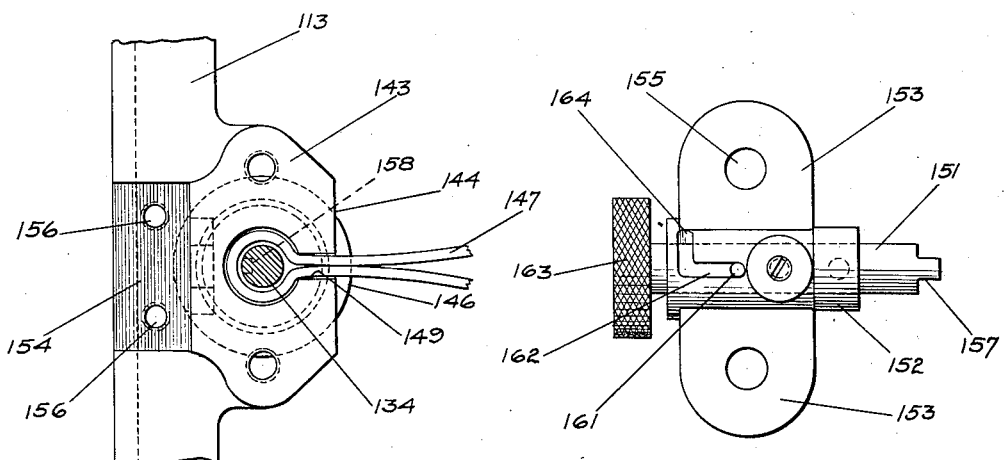
Figure 17 is a plan view of Figure 16.
Figure 18 is an enlarged detail plan view showing the means for locking the spindle against rotation.

Means are also provided for holding the locking bolt 151 in inoperative position, so that it cannot accidentally be moved into locking engagement with the spindle 134, when the latter is rotating. To thus prevent the locking bolt from accidentally being moved into locking engagement with the spindle 134, a pin 161 is secured in the bolt and engages a right angled slot 162, provided in the casing 152, as shown in Figure 18. A knurled finger grip 163 is terminally provided on the bolt 151, whereby the latter may readily be moved from one position to another. When the locking bolt is moved into inoperative position, it is pulled outwardly to the position shown in Figure 16, and rotated to the left until the pin 161 engages the end 164 of the slot 162. When thus positioned, the pin will prevent the locking bolt from accidentally being moved into locking engagement with the spindle, should a workman accidentally contact with the finger grip 163, while the spindle is rotating. Each locking device, it will be noted by reference to Figure 18, is so constructed that it may be assembled as a unit, before mounting it upon the tool-supporting head. This has been found desirable for the reason that, should the locking bolt accidentally become damaged, or the casing broken, the locking device may be quickly detached from the head, as a unit, and another one substituted therefor.

*Spindle drive*

The preferred form of drive for the tool-supporting spindle 134 is shown in Figures 1, 8, and 9. Each motor 112 has a flanged pulley 165 with which the belt 147 is engaged, as shown in Figure 8.

Means are provided for automatically taking up slack in the belt 147, and comprises a flanged belt tightener pulley 166 mounted upon a stud 167 secured in a slide 168 supported in a suitable guide 169, here shown as having inclined walls 170. (See Figure 10.) The opposed inclined walls 170 of the guide 169 are spaced apart sufficiently to permit a small strip 171 to be inserted between one one edge of the slide 168 and one of the inclined walls of the guide, as shown in Figure 10. This strip is adjustable by means of adjusting screws 172, provided in the guide for the purpose of taking up wear between the slide 168 and the walls of the guide 169.

The guide 169 is secured to a bracket 173 pivotally connected to the tubular supporting member 55, by means of vertical pivot pins 174, adjustably mounted in the spaced arms 176 and 177 of the bracket 173. The pivot pins 174 preferably have cone-shaped terminals engaging suitable anti-friction bearings 178, mounted in brackets 179 secured to the tubular supporting member 55.

A pin 181 is secured to the slide 168, and has one end of a tension spring 182 connected therewith, the other end of which is connected to an eyebolt 183, adjustably mounted in an angle bracket 184 secured to the lower leg 177 of the bracket 173. A thumb nut 185 is received in threaded engagement with the threaded stem of the eyebolt 183 for adjusting the tension of the spring 182.

In order to maintain a substantially uniform tension in the belt 147, the forward end of the bracket 173 is pivotally connected to a bar 186 by suitable pivot bolts 187, shown in Figure 9. The bar 186 is pivotally supported upon the arms 95 by suitable pivots 188, and is arranged in spaced parallel relation to the axis of the tubular member 55. As hereinbefore stated, the alined axes of the pivot pins 108, connecting the brackets 107 and 111 to the rear ends of the arms 95, and the axes of the motors are also arranged in spaced parallel relation to the axis of the tubular member 55, thereby permitting the arms 95 to laterally swing from side to side without effecting the tension in the belts 147.

*Work supporting centers*

The wood carving machine featured in this invention is also provided with suitable means for supporting articles to be carved by turning such, for example, as spindles, table legs, and the like. As shown in Figures 3 and 4, a plurality of live centers 189 are rotatably mounted in suitable bearings provided in the rear supporting beam 13, and each has a worm gear 190 meshing with a complementary worm 191 secured to shafts 180 and 192. The shaft 192 has a bevel pinion 193 secured to one end thereof which meshes with a a bevel gear 194, slidably mounted upon a drive shaft 195. The gear 194 is locked against relative rotation upon the shaft 195 by means of a key and keyway, of ordinary construction, not shown in the drawings.

The drive shaft 195 is supported in suitable bearings provided in the beams 12 and 13. A bracket 196 is secured to the beam 13 and engages the hub of the bevel gear 195 to keep it in mesh with the bevel pinion 193. The shafts 180 and 192 are mounted in suitable bearings 197 secured to the supporting beam 13. It will thus be seen that the shafts 180 and 192, bevel pinion 193, gear 194, bracket 196, and the live centers 189, are supported upon and movable with the supporting beam 13.

A plurality of dead centers 198 are adjustably mounted in sleeves 199, secured to the front supporting beam 12 and passing therethrough, as shown in Figure 3. These sleeves are threaded to receive the correspondingly threaded stems 201 of the centers 198. Each stem 201 is adapted to be locked in adjusted position by means of a lock nut 202, preferably having a suitable hand lever or wrench 203 provided thereon. Each stem 201 is further provided with a knurled finger grip or hand wheel 204, whereby it may be conveniently rotated to axially adjust it when the lock nut 202 is loosened.

The means provided for operating the live spindles 189 at the rear of the machine is shown in Figures 1 and 4, and comprises a chain 205 and engaged with a sprocket 206, secured to the forward end of the drive shaft 195 and a similar sprocket 207, rotatably mounted upon a stud 208, secured to the machine frame. A suitable crank 209 is secured to the sprocket 207 whereby the latter may be rotated to actuate the chain 205 and shaft 195. A bracket 211 is secured to the supporting beam 12 and projects outwardly therefrom to engage the hub 212 of the gear 206, as shown in Figure 4.

Figure 19:
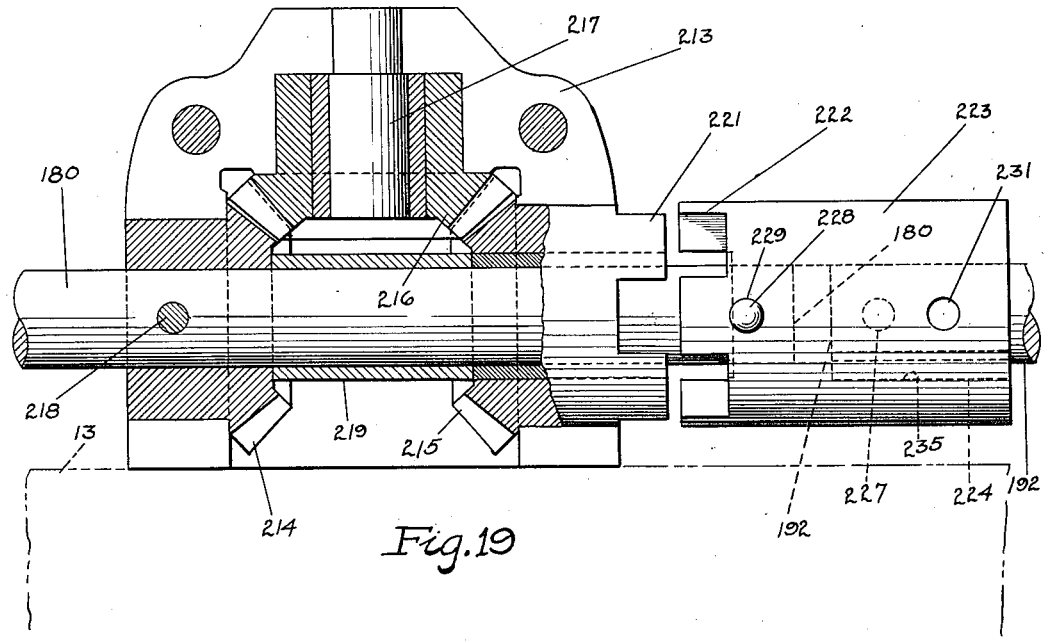
Figure 19 is an enlarged detail view showing the reversing mechanism for the work-supporting centers, the clutch being shown in inoperative position.
Figure 20:
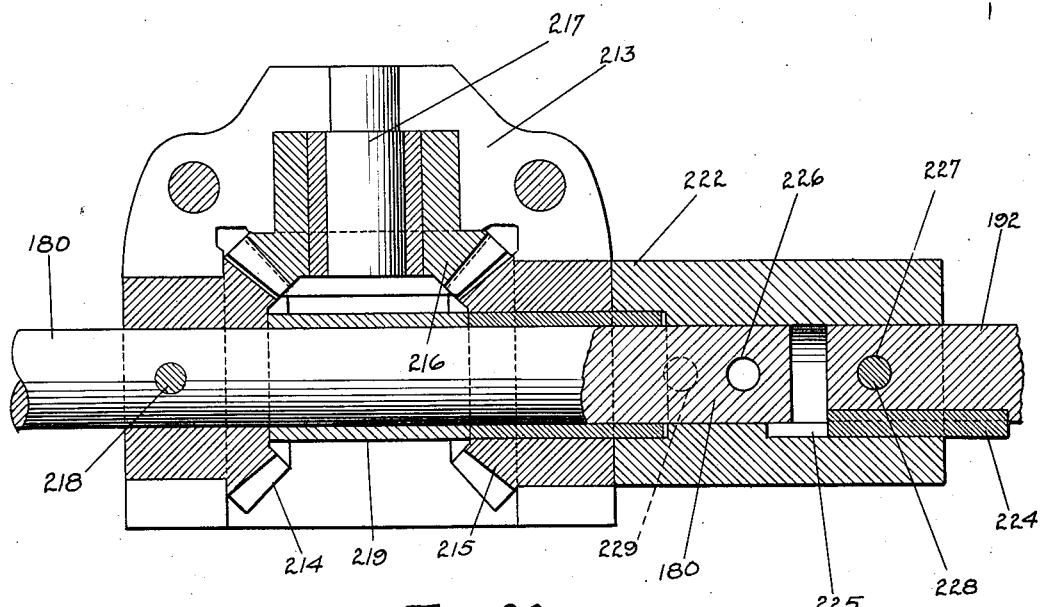
Figure 20 is a view similar to Figure 19, showing the clutch in operative position.

Means are provided in connection with the live centers 189 at the rear of the machine for simultaneously rotating a portion of these centers in one direction and the remaining centers in the opposite direction. Such means is shown in Figures 19 and 20, and comprises a gear housing 213 secured to the rear face of the supporting beam 13, as shown in Figure 4. Within this housing and upon the shaft 180, is mounted a pair of gears 214 and 215, operatively connected together for rotation in opposite directions, by an intermediate pinion 216, rotatably mounted upon a stud 217 supported in the housing 213. The hub of the bevel pinion 214 is rotatably mounted in the housing 213, and is secured to the shaft 180 by a suitable pin 218. The hub of the pinion 215 is also rotatably mounted in the housing 213, and is adapted for relative rotation with respect to the shaft 180. A spacing collar 219 is interposed between the pinions 214 and 215 to retain them in proper spaced relation.

The hub of the pinion 215 has a plurality of clutch teeth 221, adapted to be engaged by similar clutch teeth 222 provided on one end of a collar 223, adapted for sliding movement upon the adjacent ends of the shafts 180 and 192. The collar 223 is mounted to rotate with the shaft 192 by means of a key 224 and keyway 225, and is adapted for sliding movement thereon. Apertures 226 and 227 are provided respectively in the shafts 180 and 192, adapted to selectively receive a locking pin 228 which functions to lock the clutch sleeve 223 in its adjusted positions. Apertures 229 and 231 are likewise provided in the clutch collar 223, as shown in Figure 19. These apertures are adapted to be alined respectively with the apertures 226 and 227, provided in the shafts 180 and 192.

When it is desired to operate all of the live centers 189 in one direction of rotation, the clutch member 223 is moved to the position shown in Figure 19 and the pin 228 is inserted through the alined apertures 229 and 226 provided respectively in the collar 223 and shaft 180. When the shafts are thus connected, it will be noted that they are locked together for simultaneous rotation in one direction, because of the clutch member 223 being secured to the shaft 180 by the pin 228 and the shaft 192 being locked against rotation with respect to the clutch member 223 by means of the key 224 and keyway 225.

When it is desired to rotate a portion of the live spindles in one direction and the remaining ones in the opposite direction, the pin 228 is removed from the alined apertures 229 and 226 and the collar moved to the position shown in Figure 20, whereby the clutch teeth 221 and 222 will interlock, and the pin 228 is then inserted through the alined apertures 231 and 227 provided at the opposite end of the collar 223 and the shaft 192, respectively. When the two shafts are thus connected, it will be seen that when the shaft 192 is rotated in one direction, the shaft 180 will be simultaneously rotated in the opposite direction, because of the reversing gears 214, 215, and 216 mounted in the housing 213.

Figures 21 and 22 show a spindle drive of modified construction wherein each motor operates a group of three spindles instead of two, as shown in Figure 8. In this form, a belt 232 connects the pulley 165 of the motor 112, with the pulleys 146 of a group of spindles. The belt also passes around a pair of idler pulleys 233, mounted upon a bar 234 pivotally connected with a slide 235 supported in the guide 169, secured to the bracket 173 pivotally connected to the tubular supporting member 55, as shown and described with reference to Figures 8 and 9. The slide 235 is yieldably connected to the lower arm 177 of the bracket 173 by the tension spring 182, so as to cause the idler pulleys 233 to constantly act to take up slack in the belt 232. Because of the bar 234 being pivotally connected with the slide 235, the tension in the various sections of the belt will be uniform.

Figure 24:
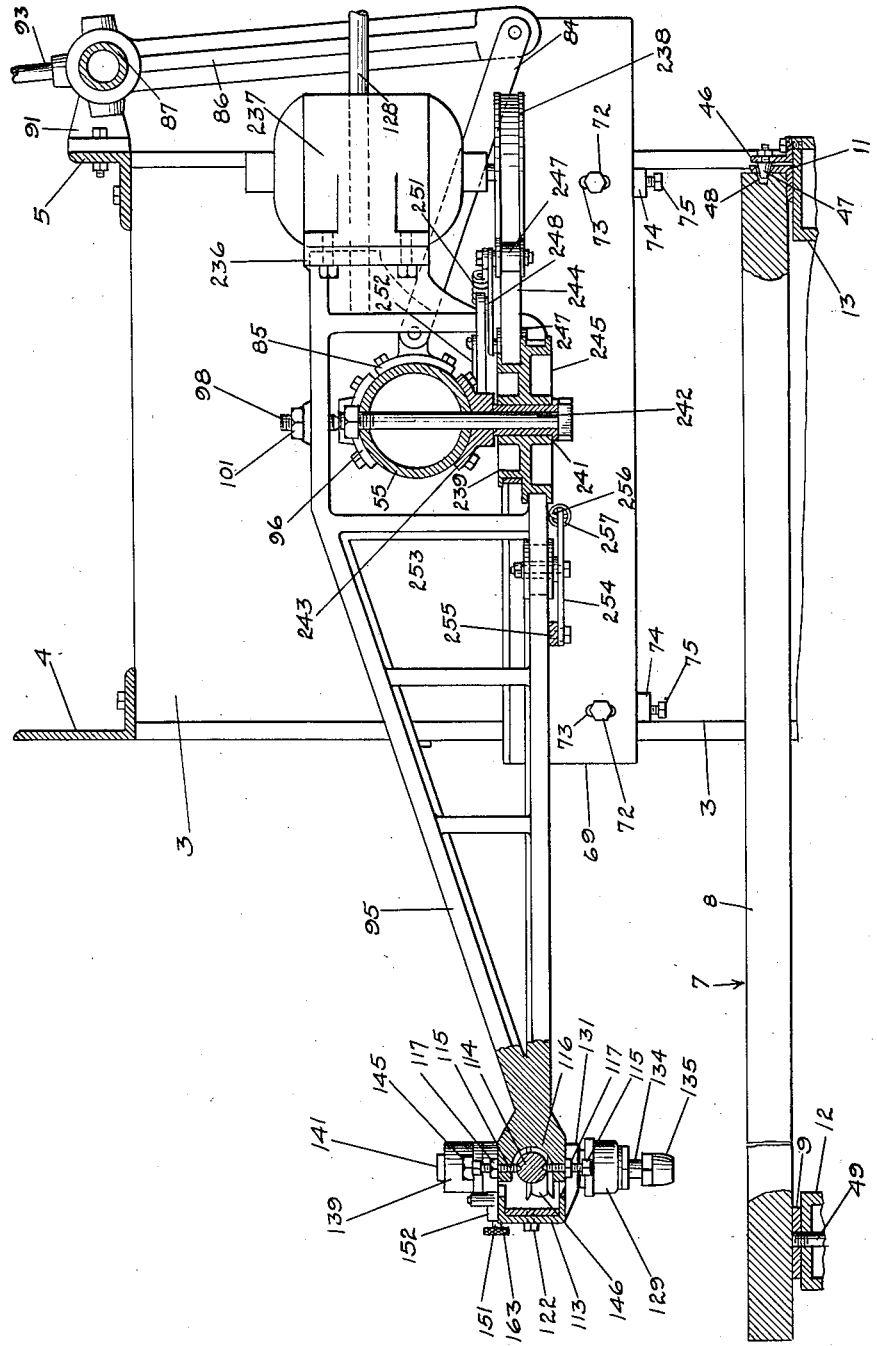
Figure 24 is a detail sectional view on the line 24—24 of Figure 23.

Figure 23 illustrates another form of spindle drive wherein each motor operates a group of four spindles. As here shown, one of the arms 95 is provided with a rearwardly extending T-shaped head 236 upon which a motor 237, having a pulley 238, is suitably secured. A plurality of pulleys 239 and 240 are rotatably mounted upon bearing sleeves 241, secured to the tubular member 55 by suitable bolts 242 and brackets 243. The bolts 242 are shown passing through the sleeves 241, brackets 243, and upwardly through suitable apertures provided in the supporting member 55. A drive belt 244 connects the motor pulley 238 of each group, with the pulleys 239 of that group, as shown in Figure 23. Each pulley 239 has a flanged pulley 245 secured thereto and operable therewith, as shown in Figure 24. Each pulley 245 has a belt 246 connecting it with the pulley 146 of the spindle 134, directly forwardly thereof. The main drive belt 244 has a belt tightener comprising a pair of small flanged pulleys 247, mounted upon an arm 248 pivotally connected to a bracket 249, suitably secured to the tubular supporting member 55. A suitable tension spring 251 has one end connected to the arm 248 and its opposite end to a bracket 252 which also is secured to the tubular member 55, and whereby the tension spring 251 will act to cause the pulleys 247 to take up slack in the drive belt 244.

Each belt 246 is provided with a belt tightener comprising a pulley 253, mounted upon an arm 254 having one end pivotally connected to a bar 255 pivotally connected to the arms 95, in a manner similar to the bar 186, shown in Figure 8. The arms 254, supporting the idler pulleys 253 of adjacent belts 246, have their outer ends connected together by means of rods 256 and a tension spring 257 which acts to hold the pulleys 253 in contact with the belts 246 to take up slack.

The various forms of spindle belt drives above described are so constructed that the driving belts between the motor and the spindles of each group, will not tend to elongate or shorten as the spindle supporting arms 95 are oscillated from side to side. All of the parts associated therewith are so arranged and organized that the centers between pulleys remain substantially uniform, regardless of the positions of the supporting arms.

Figure 26:
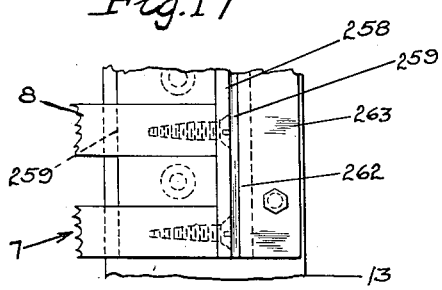
Figure 26 is a plan view of Figure 25.
Figure 25:
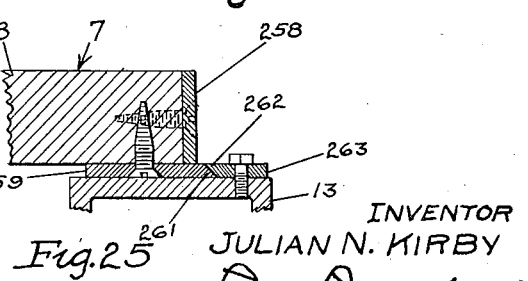
Figure 25 is a view, showing a modification where the rear ends of the table section are retained in place by plates having beveled engaging edges.

Figures 25 and 26 illustrate another method of securing the rear ends of the table sections 7 to the supporting beam 13. In this instance, a flat bar or plate 258 is secured to the rear edges of each table section, or to the ends of the slots or strips 8 of the section. A plate 259 is also secured to the bottom of each section and has one edge projecting rearwardly beyond the vertical plate 258. The projecting edge 261 of the plate 259 is beveled, as shown in Figure 25, and is adapted to engage an oppositely beveled edge 262 of a plate 263, which is permanently secured to the upper surface of the beam 13. When the beveled edges 261 and 262 are engaged as shown in Figure 25, the rear portion of the table section will be firmly held in place upon the beam 13 in a manner to prevent warping of that portion of the section.

I claim as my invention:

1. In a wood carving machine, the combination of a frame, having a table thereon, a track at each end of the frame, a carriage mounted for forward and backward movement over said table and adapted to support a plurality of wood working tools, a supporting wheel at each end of the carriage adapted to roll on said tracks, a housing enclosing each supporting wheel and movable therewith as the carriage is moved on the tracks, and anti-friction rollers mounted in said brackets and engageable with said tracks to prevent said housings from relatively rotating, when said carriage is rocked upon its axis, and threaded studs securing said brackets to the housings, whereby they may be laterally adjusted with respect thereto.

2. In a wood carving machine, the combination of a frame having a table thereon, a carriage mounted for forward and backward movement over said table, a plurality of balanced arms pivotally mounted upon said carriage and having a cutter bar pivotally connected to the forward portions thereof, a cutter head mounted upon said bar and having suitable seats therein, a tool supporting spindle rotatably mounted in bearings supported in said cutter head, a pulley on said spindle between said bearings, and one of said seats having an open slot in a wall thereof through which an endless belt may be passed, when the bearing supported in said seat is removed, to thereby facilitate threading the belt around said pulley, without removing the spindle from the cutter head.

3. In a wood carving machine, the combination of a frame having a table thereon, a carriage mounted for forward and backward movement over said table and having a plurality of balanced arms pivotally supported thereon, a cutter bar pivotally connected with the forward ends of said arms, a cutter head on said bar having upper and lower portions, bearings mounted in said upper and lower portions and rotatably supporting a spindle having a pulley secured thereto between said bearings, and means whereby when the upper bearing is detached from the head and spindle, an endless belt may be threaded around said pulley without removing the spindle from the cutter head, and without twisting or buckling the belt.

4. In a wood carving machine, the combination of a frame, a carriage mounted for forward and backward movement thereon and having a cutter bar pivotally supported thereon, a cutter head on said bar having a tool supporting spindle mounted therein and provided with a recess in its periphery, a demountable locking device on said head for locking said spindle against rotation when changing tools, said locking device comprising a casing having a locking bolt slidably mounted therein and provided with a tongue adapted to be received in the recess in said spindle, said casing having oppositely extending, apertured ears whereby the locking device may readily be secured to or removed from said head as a unit, for repairs or replacement.

5. In a wood carving machine, the combination of a frame, a movable carriage having a cutter bar pivotally supported thereon, a cutter head on said bar having a tool supporting spindle mounted therein and provided with a recess in its periphery, a demountable locking device on said head for locking said spindle against rotation when changing tools, said locking device comprising a casing having a locking bolt slidably mounted therein and provided with a tongue adapted to be received in the recess in said spindle, a bayonet slot in said casing, and a pin in said locking bolt received in said slot and whereby the locking bolt may be retained in inoperative position.

6. In a wood carving machine, the combination of a frame, a movable carriage having a cutter bar pivotally supported thereon, a cutter head on said bar having a tool supporting spindle mounted therein and provided with a recess in its periphery, a locking device of unitary structure demountably secured to said head and adapted to lock said spindle against rotation when changing tools, said locking device comprising a casing having a locking bolt slidably mounted therein and provided with a terminal tongue adapted to be received in the recess in said spindle, and interlocking means on said casing and bolt for retaining said locking bolt in inoperative position.

7. The combination of a frame including front and rear supporting rails, a table mounted on said rails, a plurality of work-supporting centers rotatably mounted in said front supporting rail, a plurality of work supporting centers also mounted in the rear supporting rail and arranged in two groups, a drive shaft for each group substantially axially alined with each other, bevel pinions mounted on one of said shafts, one of said pinions being secured to the shaft and the other loosely mounted thereon, an intermediate gear meshing with said bevel pinions and causing said pinions to rotate in opposite directions, when the shaft upon which they are mounted is rotated, clutch teeth on said loosely mounted pinion, a coupling member slidably and non-rotatably engaged with the other of said shafts and adapted to be moved into interlocking engagement with said clutch pinion, whereby said shafts will rotate in opposite directions, said coupling member having a plurality of transverse apertures therein adapted to register with apertures provided in the adjacent ends of said shafts, and a coupling pin selectively receivable in said apertures whereby the coupling member may be locked in clutching engagement with said clutch pinion to rotate the shafts in opposite directions, or whereby the coupling member may be secured in inoperative position and thereby couple together said shafts for simultaneous rotation in one direction.

8. The combination of a frame including front and rear supporting rails, a table mounted on said rails, a plurality of work-supporting centers rotatably mounted in said front supporting rail, a plurality of work-supporting centers also mounted in the rear supporting rail and arranged in two groups, a drive shaft for each group alined with each other, bevel pinions mounted on one of said shafts and one of said pinions being secured to the shaft and the other loosely mounted thereon, an intermediate gear meshing with said bevel pinions and causing said pinions to rotate in opposite directions, when the shaft upon which they are mounted is rotated, clutch teeth on said loosely mounted pinion, a coupling member slidably and non-rotatably engaged with the other of said shafts and adapted to be moved into interlocking engagement with said clutch pinion whereby said shafts will rotate in opposite directions, said coupling member having a plurality of apertures therein adapted to be moved into registration with corresponding apertures in the adjacent ends of said shafts, and a pin receivable in said apertures to lock the coupling member in a selected position.

9. In a wood carving machine, the combination of a frame, a carriage mounted for forward and backward movement thereon and having a cutter bar pivotally supported thereon, a cutter head on said carriage having a tool supporting spindle mounted therein and provided with a recess in its periphery, a demountable locking device on said head for locking said spindle against rotation when changing tools, said locking device comprising a casing having a locking bolt slidably mounted therein and provided with a tongue adapted to be received in the recess in said spindle, and means by which the locking device may readily be secured to or removed from said head, as a unit, for repair or replacement.

10. In a wood carving machine, the combination of a frame, a carriage mounted for forward and backward movement thereon, a cutter head on said carriage having a tool supporting spindle mounted therein and provided with a recess in its periphery, a demountable locking device on said head for locking said spindle against rotation when changing tools, said locking device comprising a casing having a locking bolt slidably mounted therein and provided with a tongue adapted to be received in the recess in said spindle, said casing having oppositely extending, apertured ears whereby the locking device may readily be secured to or removed from said head, as a unit, for repair or replacement.

11. In a wood carving machine, a plurality of work-supporting centers arranged in groups, a drive shaft for each group of said centers substantially axially aligned, bevel pinions mounted on one of said shafts, one of said pinions being secured to the shaft and the other loosely mounted thereon, an intermediate gear meshing with said bevel pinions and causing said pinions to rotate in opposite directions, when the shaft upon which they are mounted is rotated, clutch teeth on said loosely mounted pinion, a coupling member slidably and non-rotatably engaged with the other of said shafts and adapted to be moved into interlocking engagement with said clutch pinion, whereby said shafts will rotate in opposite directions, said coupling member having a plurality of transverse apertures therein adapted to register with apertures provided in the adjacent ends of said shafts, and a coupling pin selectively receivable in said apertures whereby the coupling member may be locked in clutching engagement with said clutch pinion to rotate the shafts in opposite directions, or whereby the coupling member may be secured in inoperative position and thereby couple together said shafts for simultaneous rotation in one direction.

JULIAN N. KIRBY.